Jan. 3, 1950 T. J. PUTZ 2,493,641
TURBINE APPARATUS
Filed June 18, 1946 2 Sheets-Sheet 1

INVENTOR
THOMAS J. PUTZ.
BY
ATTORNEY

Jan. 3, 1950
T. J. PUTZ
2,493,641
TURBINE APPARATUS
Filed June 18, 1946
2 Sheets-Sheet 2
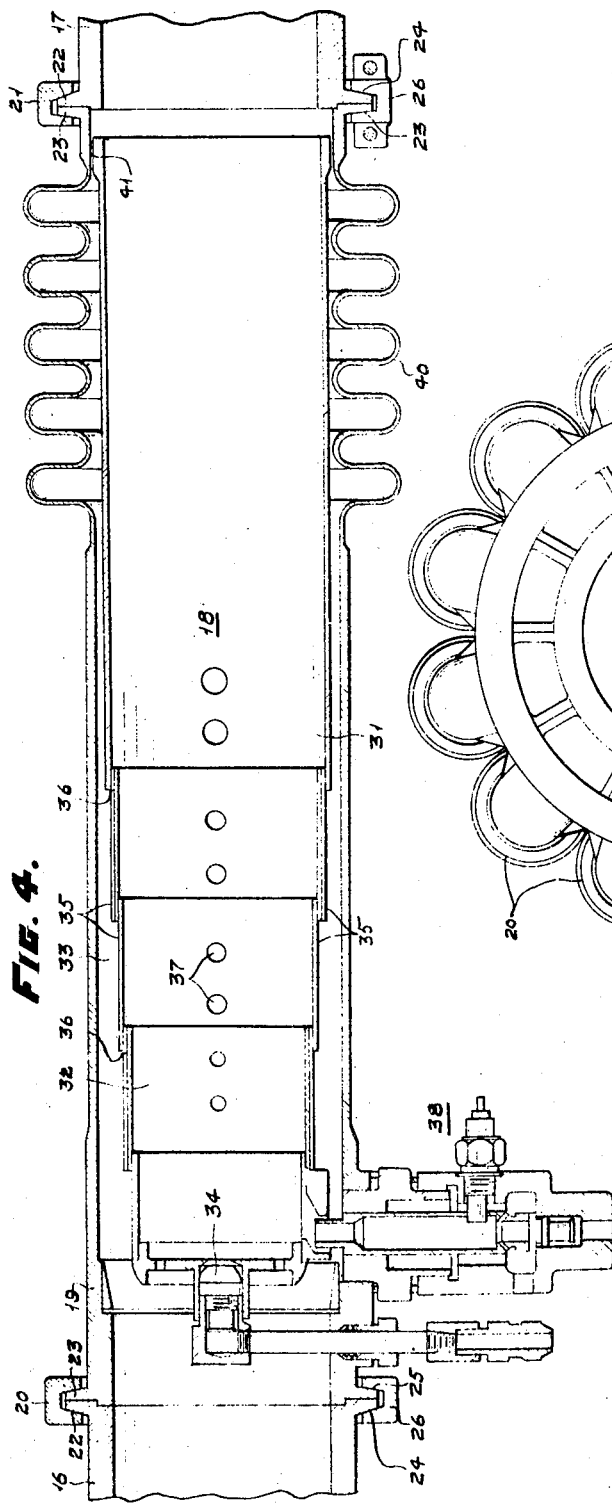
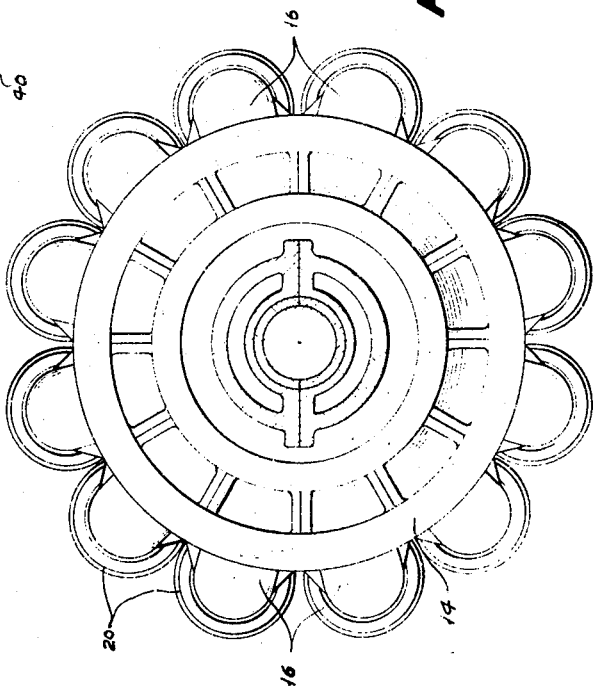
INVENTOR
THOMAS J. PUTZ.
BY
ATTORNEY Patented Jan. 3, 1950

2,493,641

UNITED STATES PATENT OFFICE 2,493,641

TURBINE APPARATUS

Thomas J. Putz, Upper Darby, Pa., assignor to Westinghouse Electric Corporation, East Pittsburgh, Pa., a corporation of Pennsylvania Application June 18, 1946, Serial No. 677,500

4 Claims. (Cl. 60—41)

The invention relates to a gas turbine plant having an axially aligned turbine and compressor with combustion apparatus interposed therebetween and it has for an object to provide, for the adjacent ends of the compressor and the turbine, adapter ring structures having a circumferential arrangement of opposed conduits together with combustion units having elongated housings attached, respectively, to the opposed pairs of conduits and the conduits diverging from the discharge end of the compressor and from the inlet end of the turbine so that the units may be arranged circumferentially with the diameter of the circle of centers thereof larger than the diameter of either the compressor or the turbine while at the same time there is preserved flow which is substantially straight-through or generally axial in the same direction from the compressor inlet to the turbine exhaust.

A further object of the invention is to provide, with an axial-flow compressor driven by an aligned axial-flow turbine, adapter rings for the discharge of the compressor and the inlet of the turbine and the rings each having a circumferential series of conduits together with combustion units having housings whose ends are attached to the conduits and which include flexible portions accommodating for axial expansion and contraction of the units.

A further object of the invention is to provide the above arrangement of combustion units whose housings include axially flexible portions and wherein each unit has a combustion tube arranged to protect the flexible portion, or avoid interference of the latter with smooth gas flow, and at the same time permit full freedom of action.

The foregoing and other objects are effected by the invention as will be apparent from the following description and claims taken in connection with the accompanying drawings, forming a part of this application, in which:

Fig. 3 is a detail view of one of the adapter ring structures taken along the line III—III of Fig. 2 and looking in the direction of the arrows; and Fig. 4 is a longitudinal sectional view of one of the combustion units.

Figure 1:
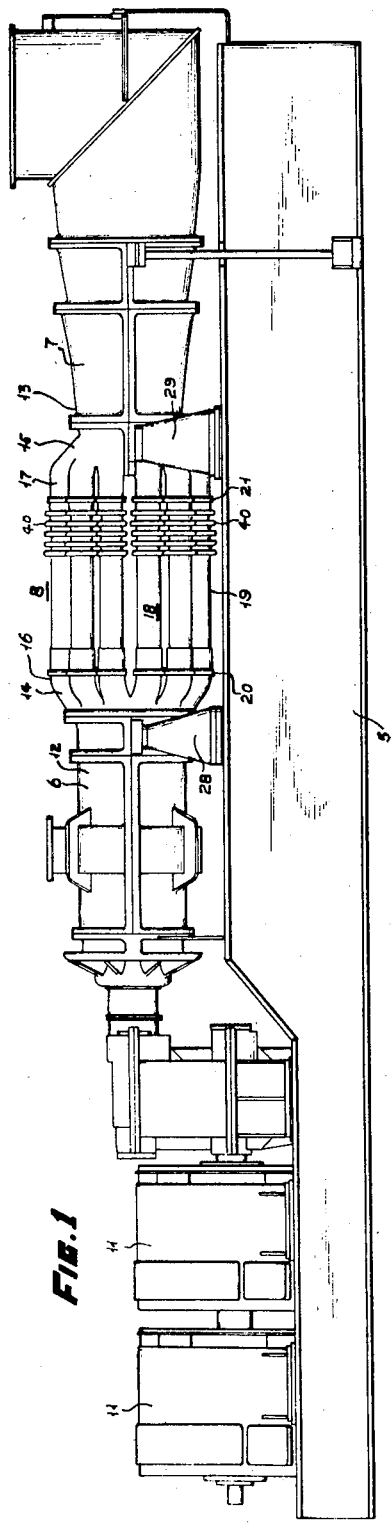
Fig. 1 is a side elevational view of the improved plant.
Figure 2:
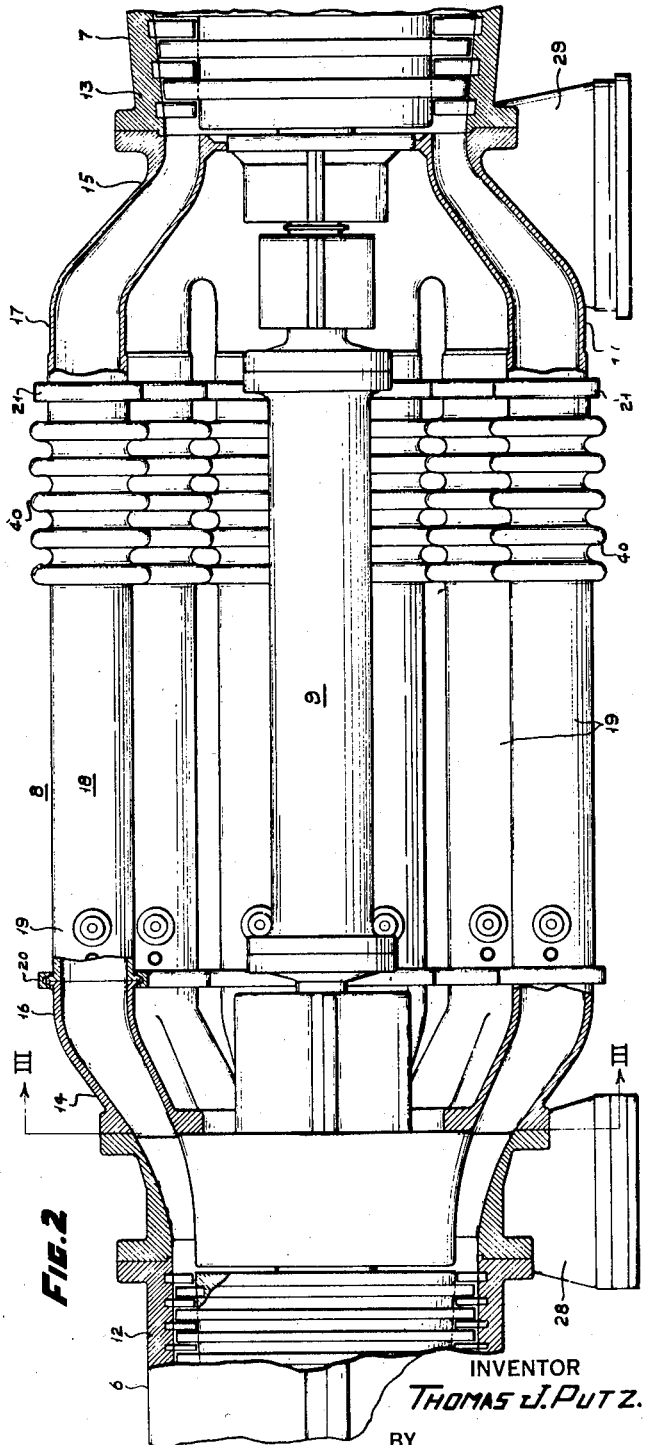
Fig. 2 is a combined elevational and sectional view showing the adapter rings and combustion units.

In the drawing, there is shown a locomotive power plant including a bed plate 5 having mounted thereon an axial-flow compressor 6 aligned with an axial-flow turbine 7 and combustion apparatus, at 8, interposed therebetween. The turbine drives the compressor by means of a torque tube or shaft 9 extending centrally or axially of the combustion apparatus, at 8, and one or more electric generators 11 are geared to the compressor. With this arrangement of compressor, combustion apparatus, and turbine, the flow is substantially straight-through from the compressor inlet to the turbine exhaust, in consequence of which losses due to changes in direction of flow are minimized and minimum transverse dimensions are required for accommodation of the plant.

The compressor and turbine cylinders or housings 12 and 13 have their adjacent ends secured against axial movement and they are connected, respectively, to adapter rings 14 and 15 having circumferential series of opposed pairs of conduits 16 and 17.

The combustion apparatus, at 8, includes a plurality of parallel combustion units, at 18, including elongated housings 19 having their ends connected, by couplings 20 and 21, to the conduits 16 and 17.

As shown, each of the couplings 20 and 21 is comprised by rabbetted conduit and housing flanges 22 and 23 having conical outer faces 24 and 25 engaged by the sides of the internal V-shaped groove of a multiple-part clamp ring 26 for drawing the flanges into face-to-face contact.

The adapter ring conduits 16 and 17 diverge outwardly with respect to the compressor and turbine axes so that the combustion units are centered on a circle whose diameter is larger than the maximum compressor or turbine diameter. By this means, it is assured that the aggregate flow area of the units is adequate and suitable for the compressor and turbine. Further, this end is attained by a plant flow passage which is axial or has a large axial component at all sections.

Preferably the adjacent ends of the compressor and the turbine are supported by vertical pairs of plates 28—28 and 29—29 having their lower ends connected to the bed plate and their upper ends connected to the adapter rings at opposite sides of the latter. The plates are spaced from the compressor and turbine axes at opposite sides of the latter and they extend parallel to such axes with the result that the adapter rings are free to expand and contract radially while they are restrained against axial movement.

Within each combustion unit housing there is disposed suitable burner means. For example, there is shown a conical wall structure 31 which divides the interior of the housing into a burner space 32 diverging toward the turbine and enveloped by an air space 33 supplied with compressed air from the compressor 8 through the associated conduits 16. The forward end of each burner space wall structure carries an atomizer 34 through which fuel is supplied to the burner space.

The burner space wall structure 31 is preferably comprised by telescoping sections 35 whose overlapping portions are formed, for example, by fluting of alternate sections, to provide ingress openings 36 for flow of air from the housing air space to the combustion space and which openings extend generally parallel to the direction of flow through the latter, such a combustion chamber wall being more particularly disclosed and claimed in the application of Miller, Serial No. 659,284, filed April 3, 1946. In addition, the wall structure may have other air ingress openings 37. Also, the atomizer 34 is preferably of a type suitable for heavy oil, an auxiliary starting burner using light oil being shown, at 38. The auxiliary burner is more particularly disclosed and claimed in the application of Koffer, Serial No. 707,293, filed November 1, 1946.

While the stream of high velocity air enveloping the burner space in flowing along the interior of the housing structure and the exterior of the burner wall structure incident to entering the burner space exerts a cooling effect on such structure, it is desirable to construct the housing structure with an expansion section 40, preferably of the bellows or accordion type to accommodate for expansion and contraction, an expansion section being particularly desirable for the reason that the compressor and the turbine are supported by means including the vertically-extending flexible plates 28—28 and 29—29 connected to the adapter rings and which plates are flexible in a direction to permit radial expansion and contraction of the rings and are stiff in a direction to resist any axial movement thereof. The expansion section of each tubular housing structure is preferably located near the discharge end of the combustion unit and the associated combustion tube wall 31 separates the expansion section from the combustion space and its discharge end has a sliding fit at 41 with the housing adjacent to the turbine adapter ring. Thus the expansion section is protected and it does not interfere with smooth flow in the combustion space, and these advantages flowing from the arrangement of the housing and the combustion tube occur without any interference with full capability of the expansion section to accommodate for axial expansion and contraction. Also, the expansion sections 40 contribute, not only to flush contact of the joint flanges 22 and 23, but also to maintenance of tightness of the joints in that they accommodate for any expansion or contraction effects which might otherwise open them.

While the invention has been shown in but one form, it will be obvious to those skilled in the art that it is not so limited, but is susceptible of various changes and modifications without departing from the spirit thereof.

What is claimed is:

1. In a power plant provided with a bed plate and having an axial-flow compressor aligned with and spaced from an axial-flow turbine and a drive shaft connecting the turbine to the compressor, ring structures attached to the discharge end of the compressor housing and to the inlet end of the turbine housing, each ring structure including a circumferential series of conduits and the conduits of one ring structure opposing and aligning with the conduits of the other ring structure, means carried by the bed plate for supporting the compressor and the turbine and including upwardly-extending plates having their lower ends attached to the bed plate and their upper ends attached to the rings, said plates extending parallel to the compressor and turbine axes and being arranged in pairs with the plates of one pair attached to the compressor ring at opposite sides thereof and the plates of the other pair attached to the turbine ring at opposite sides thereof, a circumferential series of parallel combustion units encompassing said drive shaft and each unit including a tubular elongated housing, said conduits diverging outwardly in relation to the discharge end of the compressor and the inlet end of the turbine so that the discharge ends of the compressor ring conduits and the inlet ends of the turbine ring conduits are centered on circles whose diameters are larger than the outside diameters of the compressor annular discharge area and the turbine annular inlet area, whereby the flow is either axial or has a substantial axial component in the same direction from the inlet of the compressor to the exhaust of the turbine, and means for connecting the ends of the combustion unit elongated housings to the aligned conduits.

2. Apparatus as claimed in claim 1 wherein each combustion unit tubular housing includes a longitudinally-yieldable section to accommodate for expansion and contraction.

3. In a power plant provided with a bed plate and having an axial-flow gas turbine axially aligned with and spaced from an axial-flow compressor and a drive shaft connecting the turbine to the compressor, adapter rings connected to the inlet end of the turbine and to the discharge end of the compressor, each ring structure including a circumferential series of conduits and the conduits of the two rings being arranged in opposed and aligned relation, means carried by the bed plate for supporting the compressor and the turbine and including upwardly-extending plates having their lower ends attached to the bed plate and their upper ends attached to the rings, said plates extending parallel to the compressor and turbine axes and being arranged in pairs with the plates of one pair attached to the compressor ring at opposite sides thereof and the plates of the other pair attached to the turbine ring at opposite sides thereof, whereby the rings are supported so that they are free to expand and to contract radially and are restrained against axial movement, and a circumferential series of elongated combustion units encompassing said drive shaft and including housings having their ends connected to the aligned conduits, each housing having a flexible portion which yields axially to accommodate axial expansion and contraction of the remaining portion or portions thereof.

4. In a power plant provided with a bed plate having an axial-flow gas turbine axially aligned with and spaced from an axial-flow compressor and a drive shaft connecting the turbine to the compressor, adapter rings connected to the inlet end of the turbine and to the discharge end of the compressor, each ring structure including a circumferential series of conduits and the conduits of the two rings being arranged in opposed and aligned relation, means carried by the bed plate for supporting the compressor and the turbine and including upwardly-extending plates having their lower ends attached to the bed plate and their upper ends attached to said rings, said plates extending parallel to the compressor and turbine axes and being arranged in pairs with the plates of one pair attached to the compressor ring at opposite sides thereof and the plates of the other pair attached to the turbine ring at opposite sides thereof, whereby said rings are supported so that they are free to expand and to contract radially and are restrained against axial movement, and a circumferential series of elongated combustion units encompassing said drive shaft and including housings having their ends connected to the aligned conduits and combustion tubes arranged within the housings, each combustion tube diverging in the direction of flow and having its wall formed with openings for ingress of air from within the housing to the interior of the tube, each housing having a flexible portion which yields to accommodate axial expansion and contraction of the remaining portion or portions thereof and the associated combustion tube having overlapping relation with respect to the flexible portion and having its discharge end slidably fitting the interior of the housing adjacent to the turbine adapter ring.

THOMAS J. PUTZ.

REFERENCES CITED

The following references are of record in the file of this patent:

UNITED STATES PATENTS

| Number | Name | Date |
| --- | --- | --- |
| 2,078,956 | Lysholm | May 4, 1937 |
| 2,399,865 | Halford | May 7, 1946 |